(12) United States Patent
Lee

(10) Patent No.: US 7,077,261 B2
(45) Date of Patent: Jul. 18, 2006

(54) APPARATUS FOR TRANSFERRING FLOWABLE MATERIAL

(75) Inventor: Charles Lee, Warwickshire (GB)

(73) Assignee: Matcon (R&D) Limited (GB)

( * ) Notice: Subject to any disclaimer, the term of this patent is extended or adjusted under 35 U.S.C. 154(b) by 0 days.

(21) Appl. No.: 10/506,850

(22) PCT Filed: Mar. 6, 2003

(86) PCT No.: PCT/GB03/00986

§ 371 (c)(1),
(2), (4) Date: Mar. 28, 2005

(87) PCT Pub. No.: WO03/074395

PCT Pub. Date: Sep. 12, 2003

(65) Prior Publication Data

US 2005/0220545 A1    Oct. 6, 2005

(30) Foreign Application Priority Data

Mar. 6, 2002    (GB) .............................. 0205290.0

(51) Int. Cl.
*B65G 35/00*    (2006.01)

(52) U.S. Cl. ...................................................... 198/619

(58) Field of Classification Search ................ 198/619;
414/150, 152, 172
See application file for complete search history.

(56) References Cited

U.S. PATENT DOCUMENTS

| 3,882,791 | A | * | 5/1975 | Youngscap | ................... | 198/619 |
| 4,034,848 | A | * | 7/1977 | Elliott | ........................ | 198/570 |
| 4,457,423 | A | * | 7/1984 | Stoll | .......................... | 198/619 |
| 5,147,029 | A | * | 9/1992 | Wadell | ....................... | 198/619 |
| 5,639,206 | A | * | 6/1997 | Oda et al. | ................... | 198/619 |

FOREIGN PATENT DOCUMENTS

| EP | 0376668 A | 7/1990 |
| EP | 0422261 A | 4/1991 |
| EP | 0727366 A | 8/1996 |

* cited by examiner

*Primary Examiner*—James R. Bidwell
(74) *Attorney, Agent, or Firm*—Ostrager Chong Flaherty & Broitman P.C.

(57) ABSTRACT

The invention related to apparatus for transferring flowable particulate material such as dry tablets, for example pharmaceutical tablets, from one station to another. The apparatus comprises a carrier for the tablets, and means externally of the carrier for moving the carrier between stations, the arrangement being such that the carrier and the means are not connected mechanically for movement of the carrier.

7 Claims, 1 Drawing Sheet

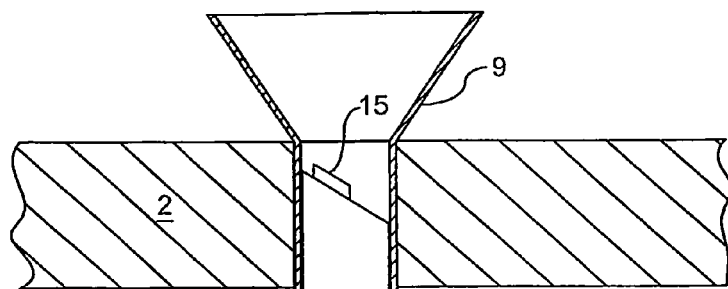
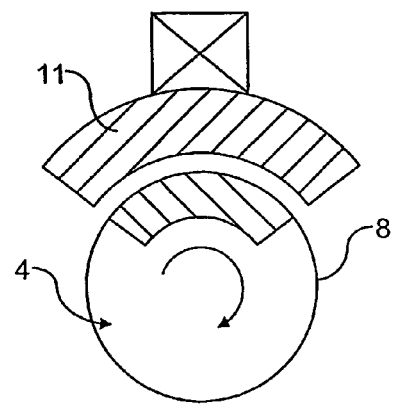
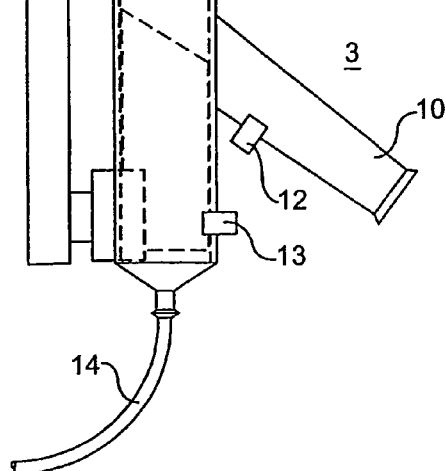
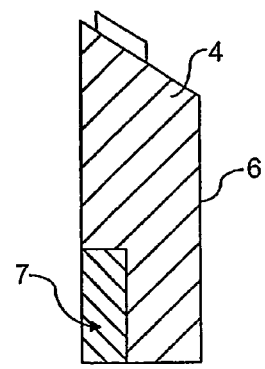
FIG. 1
FIG. 1A
FIG. 1B

APPARATUS FOR TRANSFERRING FLOWABLE MATERIAL

The invention relates to apparatus for handling flowable material, particularly dry flowable material such as tablets.

It is often necessary to transfer tablets, for example in the pharmaceutical industry, from one station to another, particularly between stations at different levels.

In the past, gravity feed or pneumatic feed causes the tablets, which are often frangible, to become crushed or broken, which whilst leading to a loss of often expensive product, also can contaminate ambient atmosphere.

It is an object of the invention to seek to mitigate these disadvantages.

According to the invention there is provided apparatus for transferring flowable particulate material from one station to another, comprising a carrier for the material, and means externally of the carrier for moving the carrier between stations, the arrangement being such that the carrier and the means are not connected mechanically for movement of the carrier. Thus, damage to material being transferred is substantially avoided as there is no mechanical connection between the carrier and the means for moving it.

Suitably, the carrier may comprise magnetic properties and the external movement means may comprise a magnet. It will be understood that as used herein the term magnet may mean a permanent magnet or an electro magnet.

The carrier may be mounted in a housing, such as a tubular housing externally of which the moving means is mounted.

Apparatus embodying the invention is hereinafter described, by way of example, with reference to the accompanying drawings.

FIG. 1 shows a schematic side elevation of apparatus according to the invention;

FIG. 1A shows an elevational view of a part of the apparatus of FIG. 1; and

FIG. 1B shows a schematic plan view of a further part of the apparatus.

Referring to the drawings, there is shown apparatus 1 for transferring flowable particulate material such as dry tablets (not shown) for example pharmateutical tablets, from one station 2 to another 3. The apparatus 1 comprises a carrier 4 for the tablets, and means 5 externally of the carrier 4 for moving the carrier 4 between stations 2 and 3, the arrangement being such that the carrier 4 and the means 5 are not connected mechanically for movement of the carrier 4.

The apparatus 1 is shown mounted to transfer the tablets from an upper station 2 to a lower station 3, though it will be understood that a reverse transfer may be carried out. The carrier 4 for the tablets has magnetic properties, for example by having a body made of a metal with magnetic properties, or by the body 6 being made of a non-magnetic material such as a plastic, with an insert 7 with magnetic properties. The carrier 4 is mounted for movement in a non-magnetic housing such as a tube 8, which has an entry port or funnel 9 at the upper station 2 by which the carrier may be topped up, and an outlet nozzle 10 at the lower station 3. The means 5 for moving the carrier 4 along the tube 8 comprises in the embodiment a magnet 11 which is externally positioned with respect to the carrier 4 and the tube 8 so that when moved in the direction of the length of the tube 8, the carrier 4 is moved along the tube, thereby gently to transfer the carrier 4, and tablets therein, between the upper and lower stations 2 and 3. The carrier 4 and tablets are moved gently as there is no mechanical connection between the magnet 11 forming the moving means 5 and the carrier 4. The magnet 11 moving means may be mounted along the tube by any suitable means, for example by motor, a screw, or other means, and the magnet may have a shape which fits round the external body 8 of the tube, which acts as a guide therefor, FIG. 1B.

There may be a sensor 12 to monitor and/or control tablet flow, and a stop 13 to provide for optimum positioning of the carrier 4 for tablet release through the nozzle 10 at the station 2.

Apparatus 1 as shown in the drawings may have the following feature:—

A device for raising or lowering components, particulates, tablets or other dry, flowable material (the product) from one level to another.

The product is transferred by a (possibly metal or plastic with metal insert) carrier, which travels inside a hollow tube, which runs from the point of product entry to product exit.

Suitable product entry and product exit ports are provided on the tube.

The carrier is constructed from a metal with magnetic properties or a plastic with such a metal insert.

The materials of construction of the tube allow an externally mounted magnet to act through the wall of the tube and hold the carrier in place.

The carrier is free of any mechanical connections. It is held in place exclusively by the external magnet.

By moving the position of the magnet along the external wall of the tube, the carrier is also moved up and down inside the tube as required.

The tube may be installed vertically or inclined as necessary to suit the facility design.

The exact position and speed of movement of the magnet/carrier is fully controllable to ensure gentle handling of the product.

The position of product within the tube can be directly determined by external sensors, which also act through the wall of the tube.

The internal (product contact surfaces and the carrier) can be fully cleaned in place automatically with liquid, for which there is a drain 14.

There may be a handle 15 of the carrier 4 for ease of removal from the tube, as by "twist and pull".

The invention claimed is:

1. Apparatus for transferring flowable particulate material from one station to another, comprising:
   (i) a carrier for the material,
   (ii) means externally of the carrier for moving the carrier between said stations,
   (iii) a tube.
   (iv) the carrier being mounted in said tube externally of which said moving means is mounted.
   (v) the carrier and the means not being connected mechanically for movement of the carrier, the carrier comprising magnetic properties and said external movement means comprising a magnet and magnet moving means, and
   (vi) further including sensors disposed about said tube for determining the position of the carrier therein.

2. Apparatus according to claim 1, wherein the tube provides a guide for guiding travel of the carrier.

3. Apparatus according to claim 1, wherein the tube provides a guide for guiding travel of the movement means.

4. Apparatus according to claim 3, wherein the tube is adapted for passing fluid thereinto for cleaning the internal surfaces thereof.

5. Apparatus according to claim 1, wherein the fluid is a liquid.

6. Material handling apparatus comprising a first station and a second station and apparatus according to claim 1 for transferring flowable particulate material from the one station to the other.

7. A method for transferring flowable particulate material form one station to another comprising the use of apparatus according to claim 1.

* * * * *